(12) United States Patent
Cragun

(10) Patent No.: US 6,356,812 B1
(45) Date of Patent: Mar. 12, 2002

(54) METHOD AND APPARATUS FOR DISPLAYING INFORMATION IN A VEHICLE

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/661,533

(22) Filed: Sep. 14, 2000

(51) Int. Cl.[7] .................................................. G06F 7/00
(52) U.S. Cl. .......................... 701/1; 701/200; 340/990; 340/995
(58) Field of Search ............................... 701/1, 23, 24, 701/117, 116, 200, 213, 215; 340/988, 990, 995, 905, 902, 903, 904; 367/903, 909

(56) References Cited

U.S. PATENT DOCUMENTS

5,648,755 A    7/1997   Yagihashi ................... 340/439

*Primary Examiner*—Yonel Beaulieu
(74) *Attorney, Agent, or Firm*—Thomason, Moser & Patterson, L.L.P.; Gero G. McClellan (57) ABSTRACT

A method and apparatus for displaying information in a vehicle is provided. Initially, navigation information is received from at least one of a remote database via a wireless network and a local sensor. A driver attention threshold is then determined from the received navigation information. Information from a network information source is displayed in the vehicle if the driver attention threshold is exceeded by a display allowance value indicative of least one of a type of information to be displayed and a type of media to be displayed.

38 Claims, 10 Drawing Sheets

| | AUDIO | TEXT | SMALL IMAGE | LARGE IMAGE | SHORT ANIMATED VIDEO, SMALL WINDOW | SHORT ANIMATED VIDEO, LARGE WINDOW | FULL MOTION VIDEO, SMALL WINDOW | FULL MOTION VIDEO, LARGE WINDOW | INTERACTIVE VIDEO |
|---|---|---|---|---|---|---|---|---|---|
| DRIVER WARNING | 9 | 9 | 9 | 9 | 9 | 8 | 7 | 6 | 4 |
| DRIVER DECISION | 8 | 8 | 8 | 7 | 7 | 7 | 6 | 5 | 4 |
| NORMAL COMMUNICATION | 8 | 7 | 7 | 7 | 6 | 6 | 5 | 4 | 4 |
| ADVERTISEMENT | 8 | 7 | 7 | 6 | 6 | 5 | 5 | 4 | 4 |

METHOD AND APPARATUS FOR DISPLAYING INFORMATION IN A VEHICLE

BACKGROUND OF THE INVENTION

1. Field of the Invention

The invention relates to techniques that facilitate the exchange of information among computers. More particularly, the invention relates to a method, article of manufacture and apparatus for displaying information in a vehicle.

2. Background of the Related Art

Vehicles, such as automobiles, generally feature one or more displays to provide locally obtained information related to a current state of the vehicle. The display is positioned within in the vehicle such that a driver of the vehicle may view information while driving the vehicle. For example, the display may provide information on a windshield (as in the case of a heads-up display (HUD)), a dashboard or a steering wheel. Each display may contain one or more windows. Locally obtained information, such as a speed of the vehicle, a direction traveled by the vehicle, whether the air condition is in use, whether the hazard light is on, whether a headlight is on, a fuel status of the vehicle, and the like, may be provided on these windows.

The current displays are capable of providing different types of media from a variety of sources. For example, the display may provide audio, text, still images, animated video, full motion video and interactive video. Additionally, the display may provide information from various databases and remote servers using a wireless network However, providing all these types of information and media may overwhelm or otherwise compromise the safety of the driver of the vehicle.

Therefore, a need exists for a method, and apparatus for effectively processing the different types of information and media on the display without compromising the safety of the driver.

SUMMARY OF THE INVENTION

Embodiments of the invention provide a method and apparatus for displaying information in a vehicle. Specifically, the method initially receives navigation information from at least one of a remote database via a wireless network and a local sensor, and determines a driver attention threshold from the received navigation information. Information from a network information source is displayed in the vehicle if the driver attention threshold is exceeded by a display allowance value indicative of least one of a type of information to be displayed and a type of media to be displayed.

In another embodiment of the invention, an apparatus comprising a display device, a memory, an interface and a processor is provided. The memory stores a display program. The interface is configured to receive navigation information from at least one of a remote database via a wireless network, and a local sensor. The display device displays information from network information source via the wireless network. The microprocessor executes the display program retrieved from the memory and determines a driver attention threshold from the navigation information received at the interface. Information from a network information source is displayed on the display device if the driver attention threshold is exceeded by a display allowance value indicative of least one of a type of information to be displayed and a type of media to be displayed.

Additionally, a computer readable medium storing a software program is provided, when the software program, when executed by a microprocessor, causes the microprocessor to execute a method. In one embodiment of the computer readable medium, the method initially receives navigation information from at least one of a remote database via a wireless network and a local sensor, and determines a driver attention threshold from the received navigation information. Information from a network information source is displayed in the vehicle if the driver attention threshold is exceeded by a display allowance value indicative of least one of a type of information to be displayed and a type of media to be displayed.

BRIEF DESCRIPTION OF THE DRAWINGS

Embodiments of the present invention can be readily understood by considering the following detailed description in conjunction with the accompanying drawings, in which.

To facilitate understanding, identical reference numerals have been used, where possible, to designate identical elements that are common to the figures.

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention provide a method and apparatus for displaying information in a vehicle. In one embodiment, navigation information is received from at least one of a remote database via a wireless network and a local sensor. A driver attention threshold is then determined from the received navigation information. The driver attention threshold is an indication of a level of attention required by a driver of a given skill or ability, e.g., an average driver. Information from a network information source is displayed in the vehicle if the driver attention threshold is exceeded by a display allowance value indicative of least one of a type of information to be displayed and a type of media to be displayed.

Figure 1:
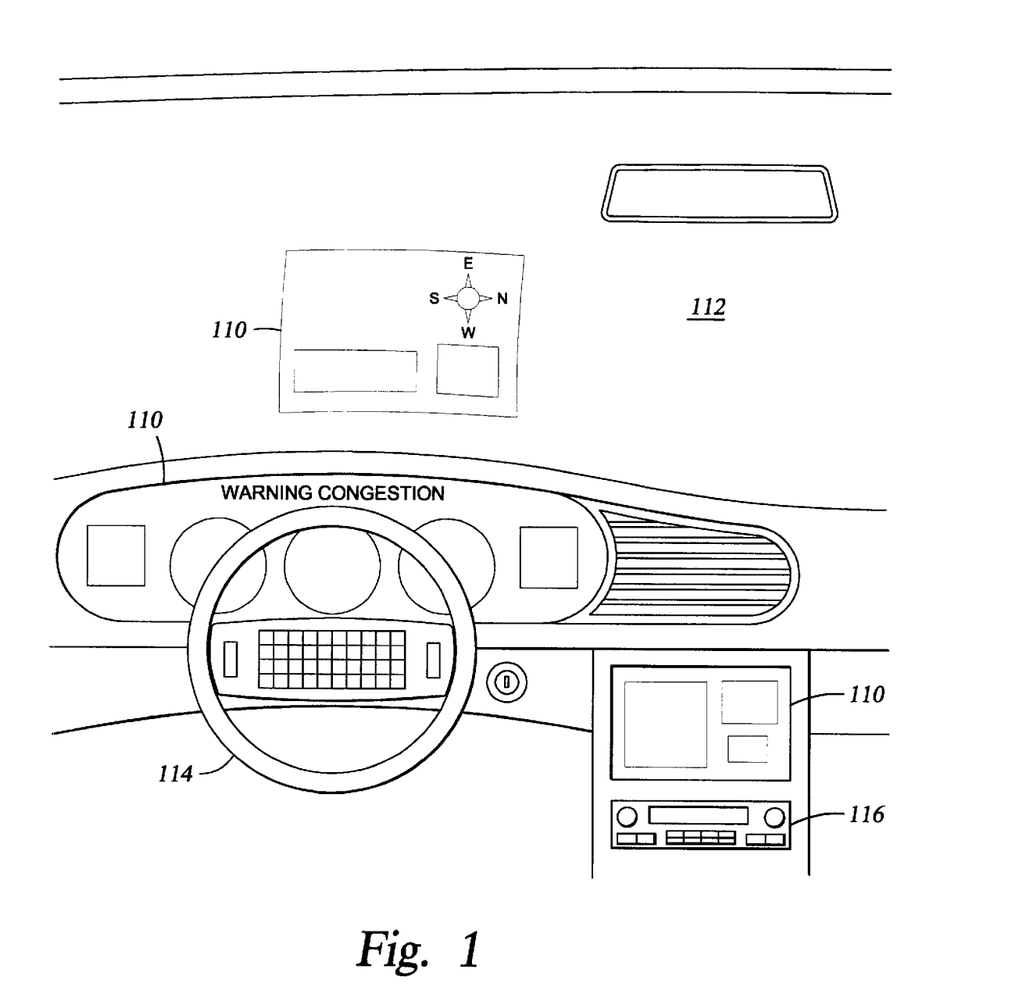
FIG. 1 depicts a display in an automobile vehicle in accordance with the present invention.

FIG. 1 depicts possible locations of a display 110 in a vehicle, e.g., an automobile or an airlane. Each display 110 comprises one or more windows viewable by the driver. In one embodiment, the display 110 may be configured as a heads-up display in a front window 112 of the automobile. Such a heads-up display may be projected onto the front window 112 or embedded into the front window 112. The display may also be configured on a dashboard 114, on or behind a steering wheel 114, or above a stereo module 116. However, embodiments of the invention are not limited to these locations. Any location in the vehicle viewable by the driver is contemplated within the scope of the invention.

Various factors are considered in determining whether to provide the display 110 and what type (mode) of media to provide. For example, weather information, traffic information, are local ordinance information are considered in whether to provide the display 110. Additionally, the type of media to provide and the mode of media to provide are considered in whether to provide the display 110. In the preferred embodiment, the weather information, traffic information and local ordinance information are utilized to determine a required driver attention (RDA) value, while the type of media to provide and the mode of media to provide are utilized to determine a display allowance value for a particular driver. The RDA value typically represents a previously or empirically determined level of attention for a given condition of the state of the vehicle, weather conditions and traffic conditions, but may be configurable in limited situations, e.g., local ordinances. The display allowance value is configurable by the driver or user. If the display allowance value is greater than the RDA value, the display 110 is provided. Although some embodiment of the present invention utilize a display allowance value and a RDA value to define whether to provide a display 110, other embodiments may define different parameters in determining whether to provide the display 110.

Figure 2:
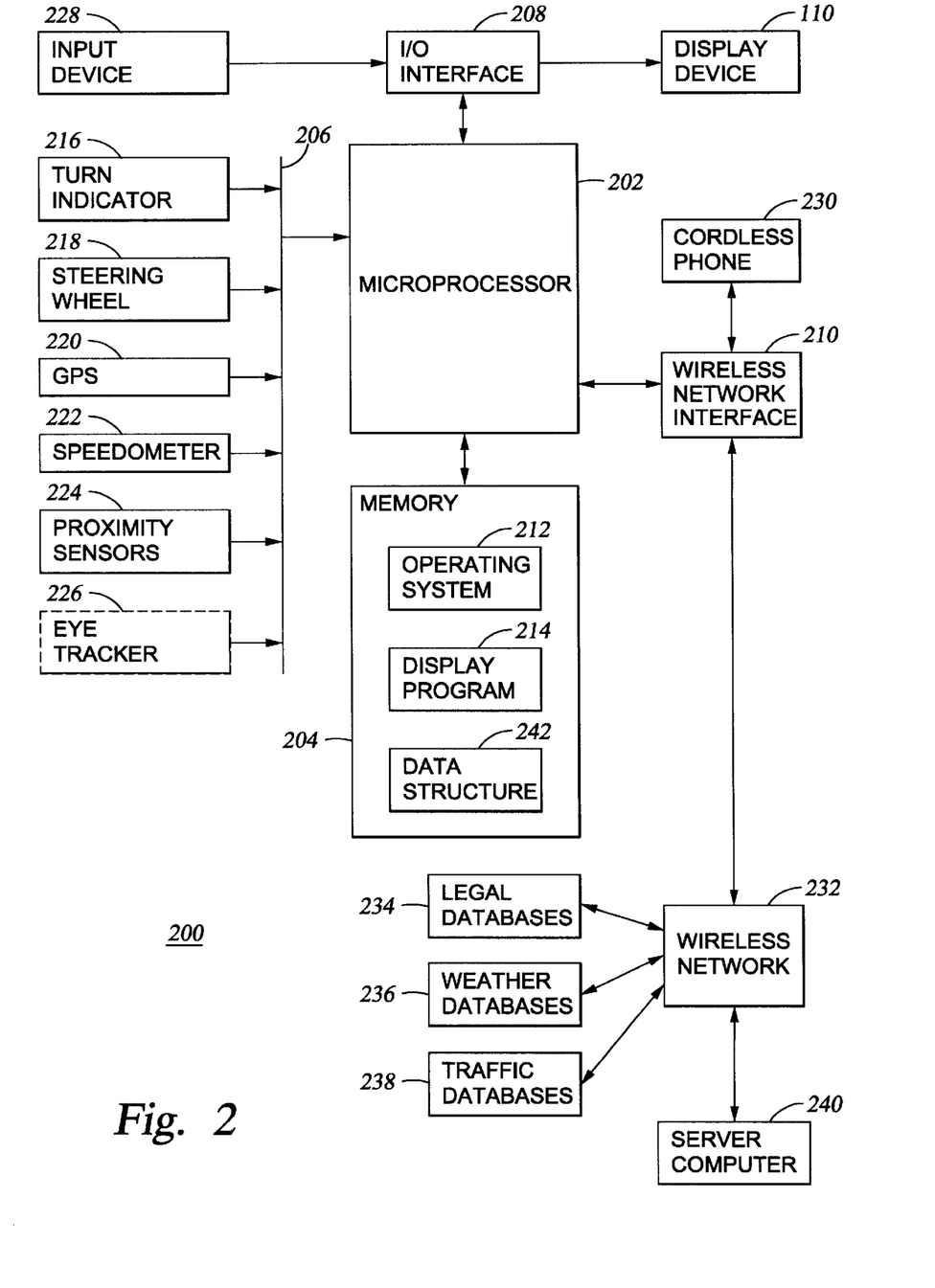
FIG. 2 depicts a computer system utilized for implementing the present invention.

FIG. 2 depicts a computer system 200 in which some embodiments may be implemented in a vehicle, e.g., an automobile. Specifically, the computer system 200 generally comprises a microprocessor 202, a memory 204, and a plurality of interfaces. The interfaces include a sensor interface 206, an input/output (I/O) interface 208 and a wireless network interface 210.

The microprocessor 202 receives instructions from the memory 204 and performs operations based upon the requirements of an operating system 212 and a display program 214. Upon executing the display program 214, the microprocessor 202 also receives navigation information via the sensor interface 206 from a turn indicator 216, a steering wheel 218, a global positioning system (GPS) 220, a speedometer 222, proximity sensors 224 and an optional eye tracker 226. Information from the turn indicator 216 represents a direction of signaling by a driver of the vehicle. Information from the steering wheel 218 represents a direction of the movement of the vehicle. The GPS 220 provides a location of the vehicle, and the speedometer 222 provides the speed of the vehicle. Proximity sensors 224 provide information as to whether the vehicle is too close, i.e., within a threshold distance, to another vehicle or a divider. The eye tracker 226 determines whether a driver is looking on the road being traveled. Eye trackers are known in the art. One example is provided on the web site http: www.eecs.tufts.edu/~jacob/papers/barfield.html. These devices 216–226 and their equivalents are well known in the art.

The microprocessor 202 may receive instructions from an input device 228 via the I/O interface 208. Examples of the input device 228 include a keyboard, a keypad, a light pen, a touch screen, a button, a mouse, a track ball, a speech recognition unit, and the like. Although the input device 228 is shown separately from the display 110, the input device 228 and the display 110 may also be combined. For example, a display 110 may have an integrated touch-screen or an integrated keyboard. The microprocessor 202 may also receive a signal from a cordless telephone 230 via a wireless network interface 210. For example, the microprocessor 202 may utilize the signal from the cordless telephone 230 to determine whether the cordless telephone 230 is in use.

Additionally, the microprocessor 202 may receive navigation information from various remote databases via a wireless network 232 and the wireless network interface 210. Illustratively, such remote databases include legal databases 234, weather databases 236 and traffic databases 238. The legal database 234 contains local ordinances of the city, town or municipality where the vehicle is driving in. The weather database 236 contains weather information for an area or region where the vehicle is driving in. The traffic database 238 contains traffic information of an area or region where the vehicle is driving in. The microprocessor 202 may also receive information from other remote databases (not shown) or remote server computers 240 via the wireless network 232 and the wireless network interface 210.

The memory 204 contains the data and programming structures necessary for the operation of the computer system 200. Illustratively, the memory 204 includes an operating system 212, a heads up display program 214, various application programs, e.g., a browser program (not shown), and data structures 242. The memory 112 may comprise a combination of memory devices, including random access memory (RAM), nonvolatile or backup memory (e.g., programmable or flash memories, read only memories (ROM), and the like).

The sensor interface 206, I/O interface 208 and wireless network interface 210 transfer information between the microprocessor 202 and various external sensors, devices and networks. The sensor interface 206 includes various controllers for the various sensors 216, 218, 220, 222, 224 and 226. The I/O interface 208 includes different controllers for input devices 122, and output devices 124. The wireless interface 210 includes controllers for the cordless phone 230 and the wireless network 232. Communications between the microprocessor 202 and any of the remote databases 234, 236 and 238 via the wireless network 232 may occur in accordance to any wireless protocol, e.g., Transmission Control Protocol/Internet Protocol (TCP/IP). Additional support circuits (not shown) may include controllers for the memory 204.

As will be described below, aspects of the preferred embodiment pertain to specific method steps implementable on computer systems. In another embodiment, the invention may be implemented as a computer program-product for use with a computer network system 100. The programs defining the functions of the preferred embodiment can be provided to a computer via a variety of signal-bearing media, which include but are not limited to, (a) information permanently stored on non-writable storage media (e.g. read-only memory devices within a computer such as read only CD-ROM disks readable by a CD-ROM or DVD drive; (b) alterable information stored on a writable storage media (e.g. floppy disks within diskette drive or hard-disk drive); or (c) information conveyed to a computer by wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Once the microprocessor 202 receives the input data from the various sources, the microprocessor 202 determines whether to provide the display 110 via the I/O interface 208, and the media type of the display 110. To perform this determination, the microprocessor 202 may evaluate information from the legal database 234, the weather database 236 and the traffic database 238, various sensors 216–226, the type of media to display and the type of information to display. In one embodiment, the display 110 is provided if the driver attention threshold (RDA value) is exceeded by a display allowance value. The driver attention threshold is an indication of attention required by an average driver and is determined from information received from the sensors 216–226, the weather database 236, the traffic database 238 and optionally the legal database 234. The display allowance value is a programmed value indicative of a type of information to be displayed and the type of media to be displayed. The determination of whether to provide the display 110 is further described with respect to FIGS. 4–7. Once the display 110 is provided, the driver may utilize the display to access information, e.g., web pages and electronic mail (e-mail) files, from a network information source or a remote server computer 240.

Figure 3:
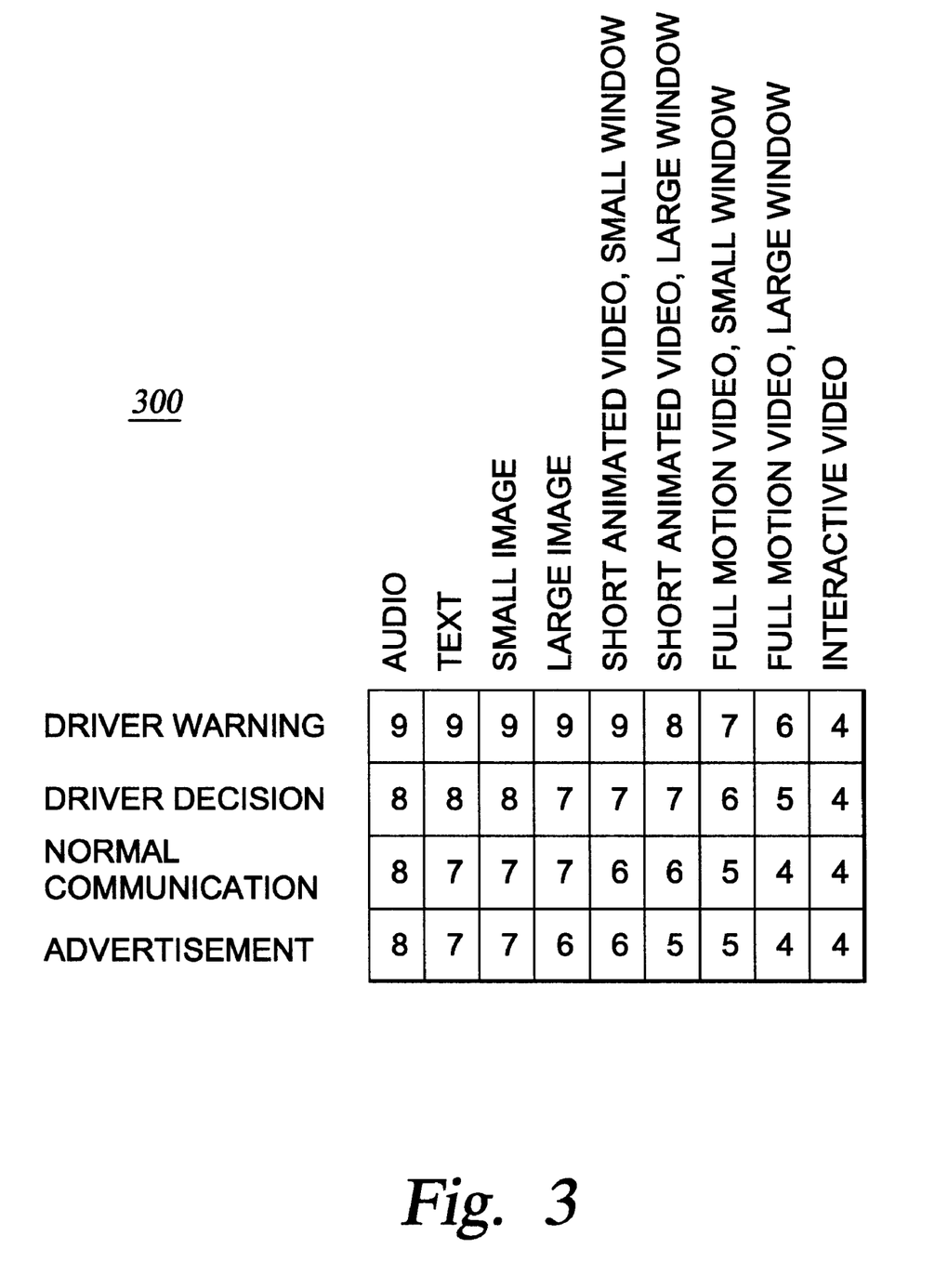
FIG. 3 depicts a profile table containing a plurality of display allowance values.

FIG. 3 depicts a profile table 300 containing a plurality of display allowance values. The profile table 300 is one example of data structure 242 stored in the memory 204. The display allowance values represent a likelihood or probability that the system will provide the display 110 for a given required driver attention (RDA) value. Illustratively, a higher display allowance value implies a higher probability of providing a display 110, since the display 110 is provided when the display allowance value exceeds the RDA value. Although the display allowance value may assume any number within a range between 0–10, the display allowance values may assume other ranges, e.g., 0 to 100, −10 to 10. However, for ease of comparison between the display allowance value and the RDA value, the ranges of the display allowance value and the RDA value are typically the same or substantially similar.

Each display allowance value in the profile table 300 corresponds to a particular type of information to provide on the display 110 and the type of media to provide on the display 110. In decreasing order of importance, types of information to be provide may include driver warning, information requiring driver decision, normal communication including access from a remote server computer 240, and advertisements from the server computer 240. Although four types of information are shown, the profile table 300 may also consider other types of information. Illustratively, a higher display allowance value is assigned to more important type of information. For example, assuming the type of media to provide is the same, the display allowance value is at least as high for a driver warning message as for an advertisement.

A higher display allowance value is also given to media that has a smaller likelihood of distracting a driver. Such media may also require less bandwidth or otherwise easier to transmit than media having lower display allowance values. For the same type of information to provide on the display 110, the display allowance value is at least as high for audio than for interactive video. In terms of decreasing display allowance values or decreasing ease of transmission, types of media to provide may include audio, text, small images, large images, short animated video having a small window, short animated video having a large window, full motion video having a small window, full motion video having a large window and interactive video. The terms small, large, short and long are relative terms that are defined in the implementation of the display 110. Moreover, the actual number of types of media to provide may be more or less than the number illustratively shown.

The display allowance values in the profile table 300 may also differ among drivers. A different profile table 300 is generated and assigned for each driver. The profile table 300 for more experienced drivers would generally contain higher display allowance values than for relatively novice drivers. Thus, given the same required driver attention (RDA) value, a particular type of media and type of information is more likely to be provided on the display 110 for more experienced drivers.

The required driver attention (RDA) value represents a previously determined, e.g., empirically determined, level of attention required under various conditions such as a given state of the vehicle, weather conditions and traffic conditions. A higher RDA value corresponds to a higher level of attention required to safety navigate the vehicle under the given state of the vehicle, weather conditions and traffic conditions. For example, an emergency interruption, e.g., RDA=9, would require a significantly higher attention level than a diverted awareness condition (fast change), e.g., RDA=3. A listing of the different conditions of the RDA is provided below in Table 1. However, the RDA values are not limited to the conditions listed below.

TABLE 1

| RDA Value | Description of Attention Required |
|---|---|
| 0 | None |
| 1 | Back of Mind Awareness (Slow Change) |
| 2 | Diverted Awareness (Fast Change) |
| 3 | Very Long Diversions |
| 4 | Long Diversions |
| 5 | Medium Diversions |
| 6 | Short Diversions |
| 7 | Very Short Diversions |
| 8 | Brief Information Gathering |
| 9 | Emergency Interruption |
| 10 | Total Attention Required |

Figure 4:
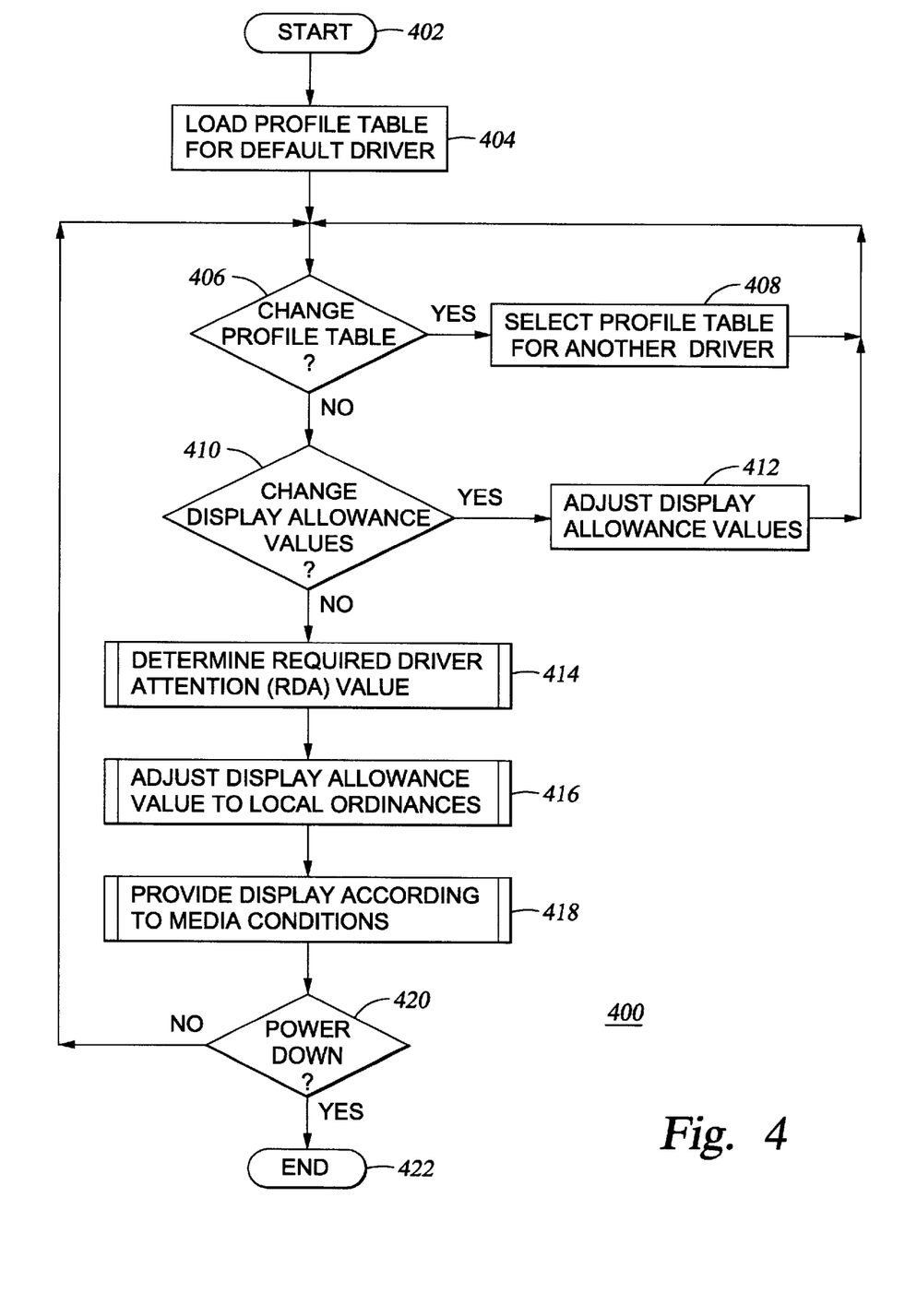
FIG. 4 depicts a flow diagram of a method for implementing the present invention.
Figure 5A:
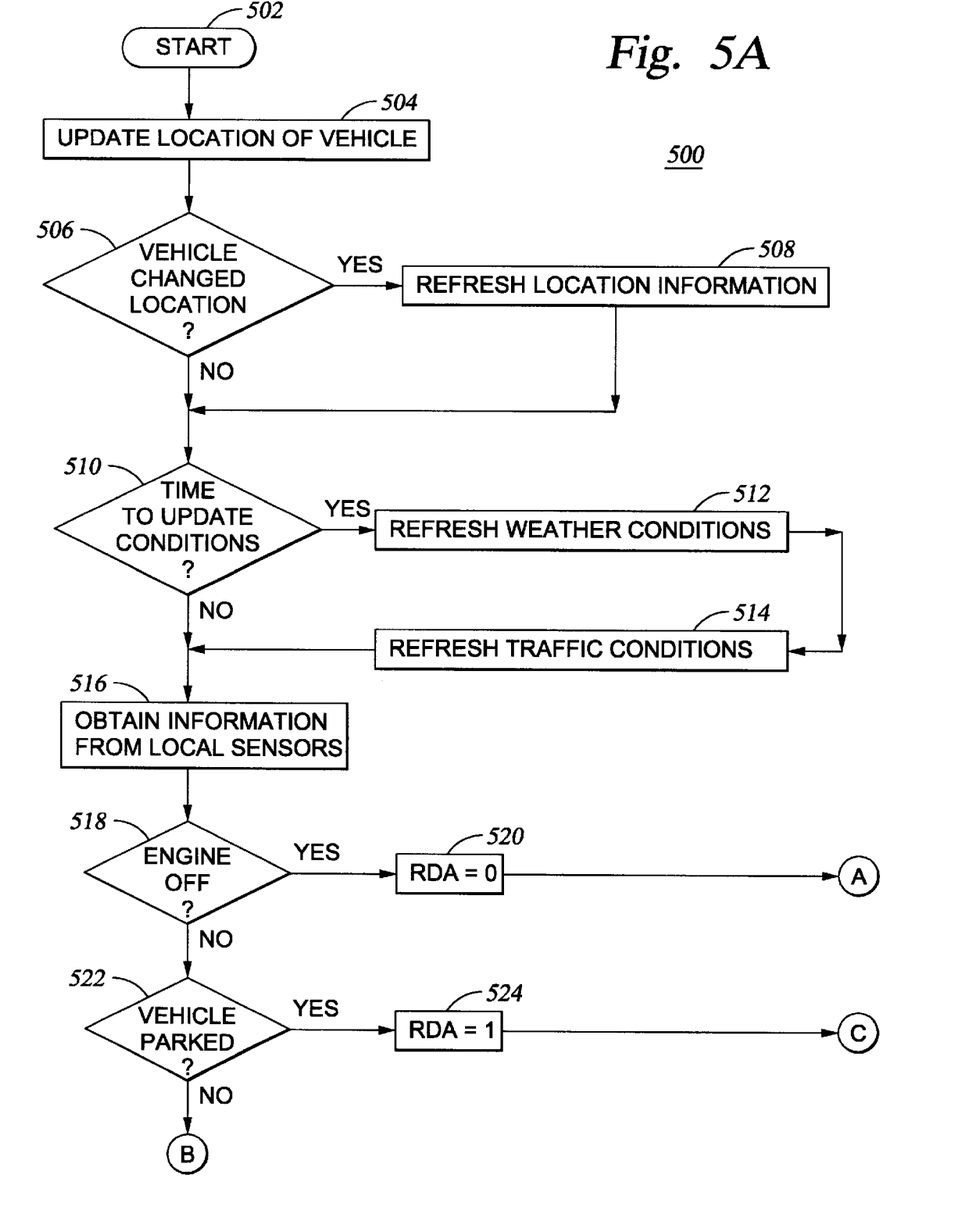
FIGS. 5A, 5B and 5C, taken together, depict a flow diagram of a method for determining a required driver attention (RDA) value.
Figure 5B:
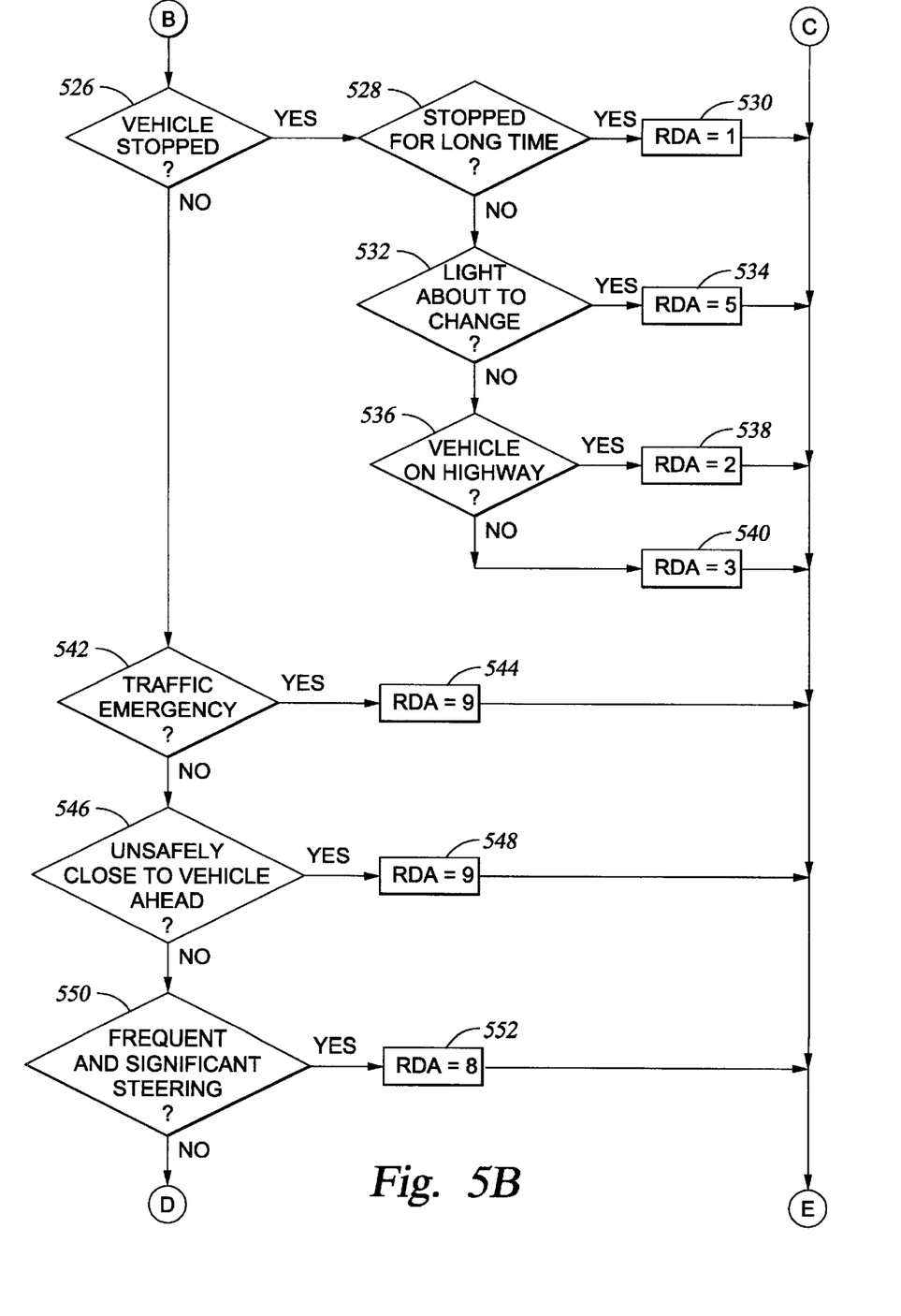
Figure 6:
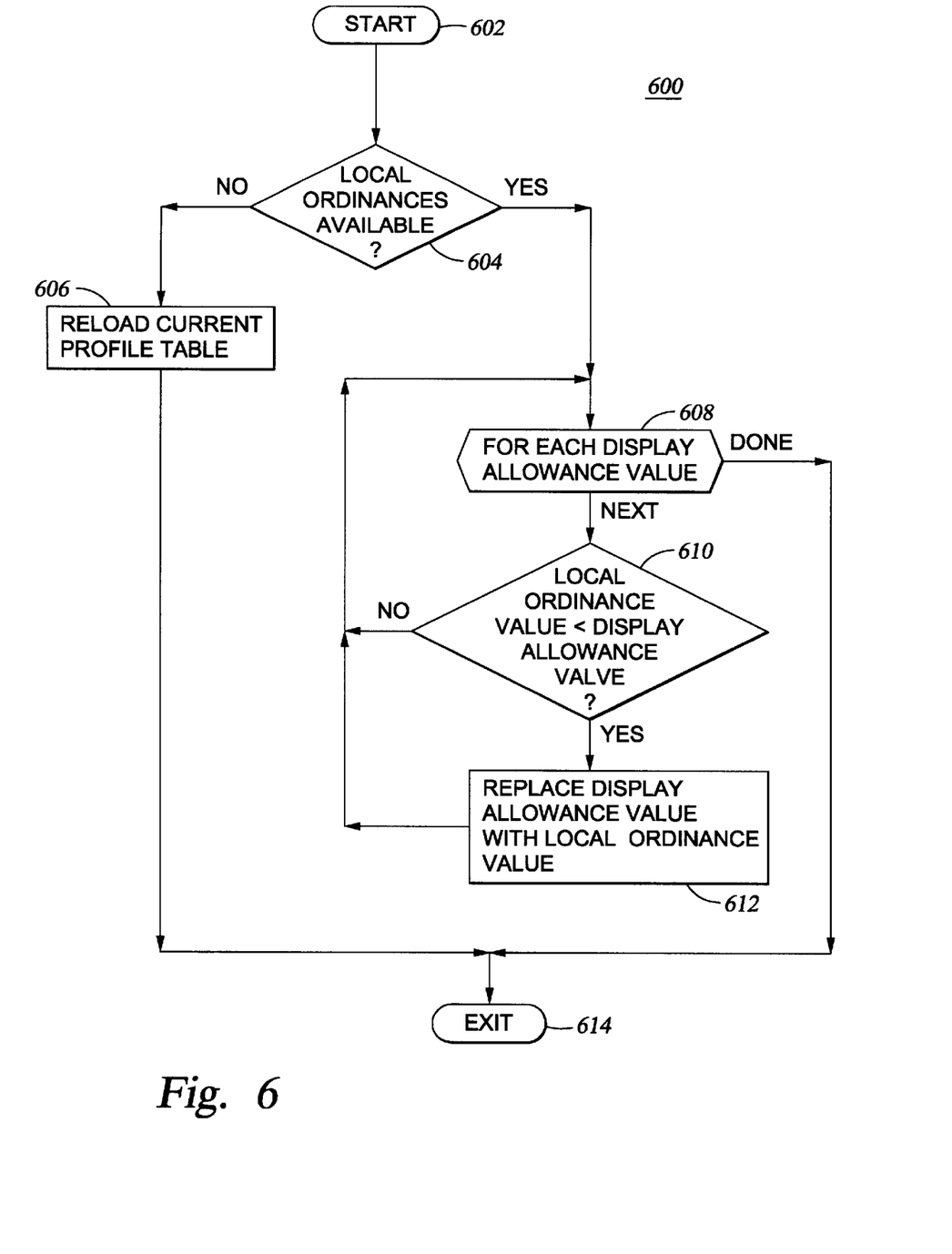
FIG. 6 depicts a flow diagram of a method for adjusting the display allowance value according to local ordinances.
Figure 7A:
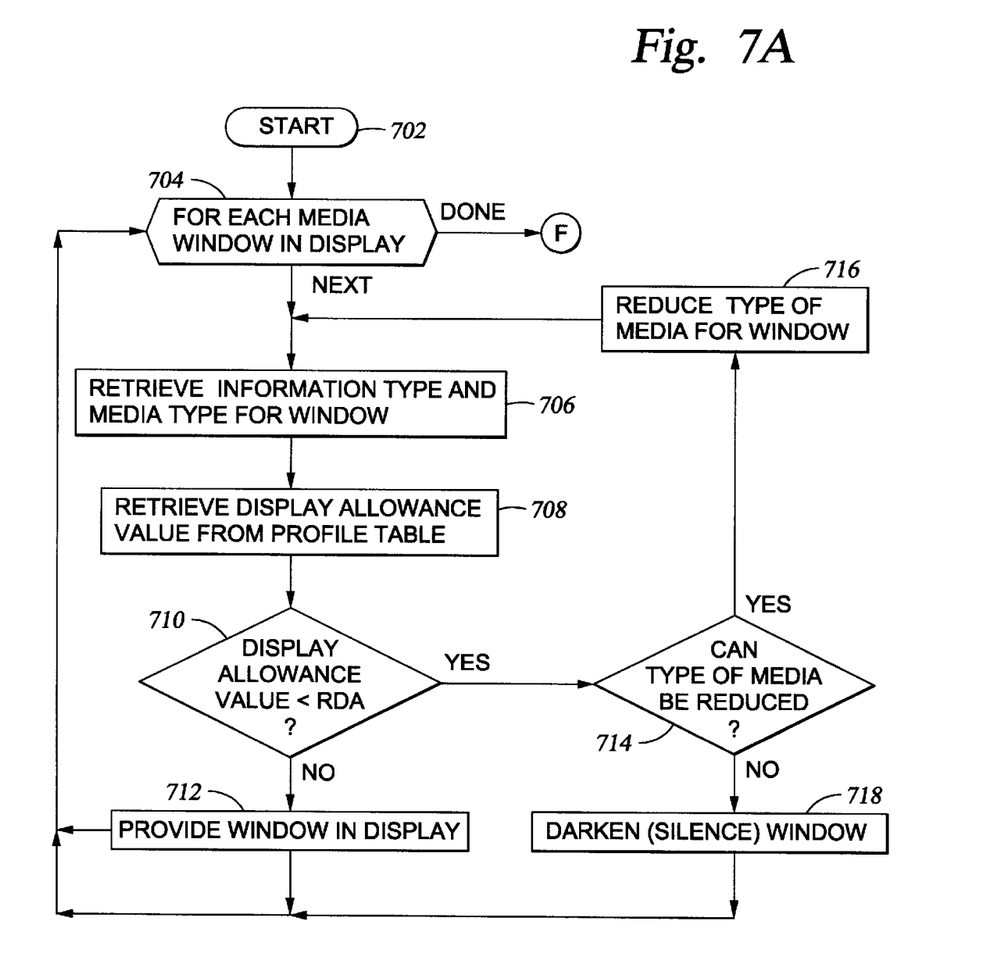
FIGS. 7A and 7B, taken together, depict a flow diagram of a method for providing a display in accordance with the present invention.
Figure 7B:
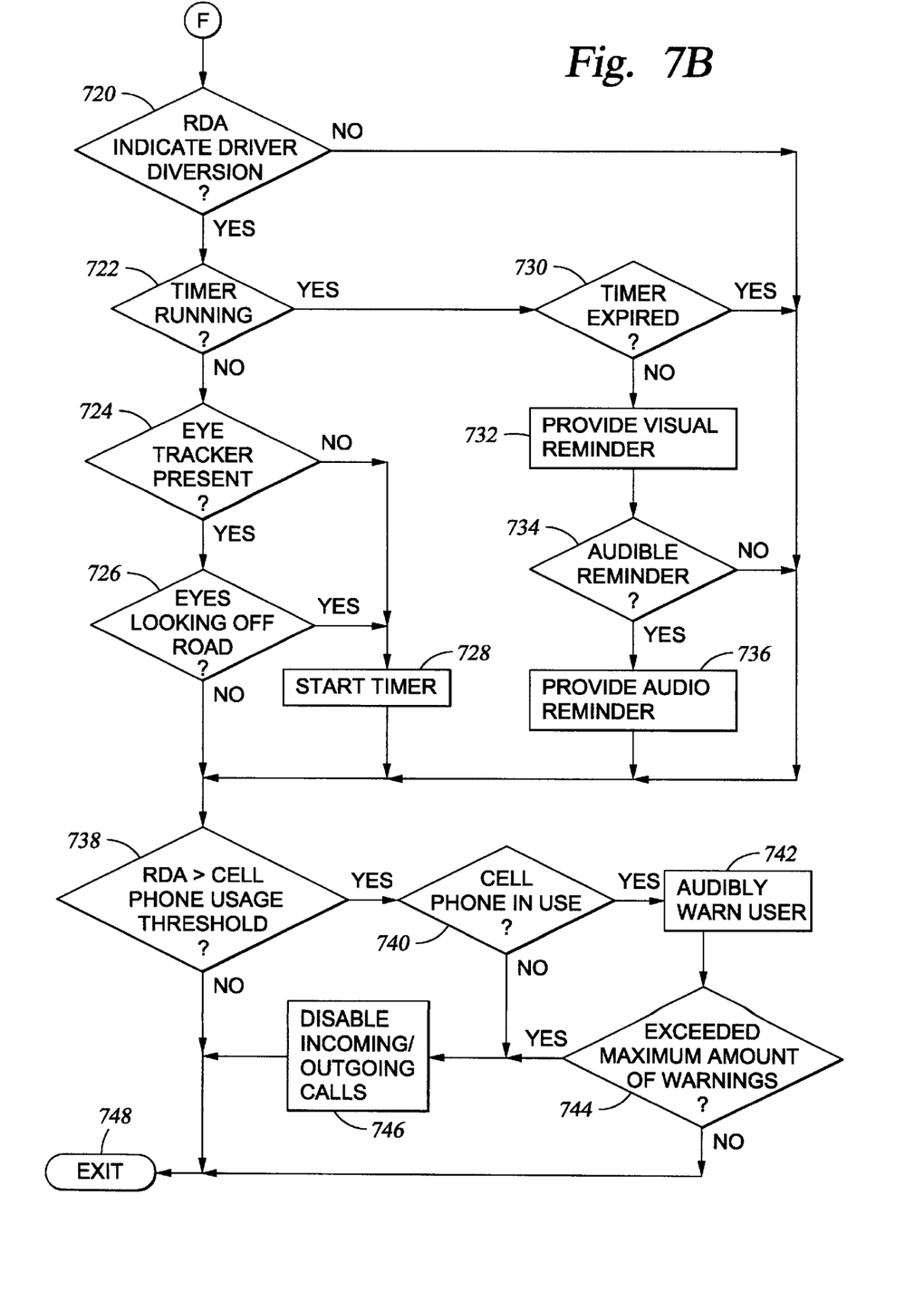

FIG. 4 depicts a flow diagram of a method 400. FIGS. 5A and 5B, taken together, depict a flow diagram of a method 500 for determining a required driver attention (RDA) value. FIG. 6 depicts a flow diagram of a method 600 for adjusting a display allowance value according to local ordinances. FIGS. 7A and 7B, taken together, depict a flow diagram of a method 700 for adjusting the display. To best understand embodiments of the invention, the reader should simultaneously refer to FIGS. 4–7.

Referring to FIG. 4, the method 400 starts at step 402 and proceeds to step 404, where a profile table 300 is loaded for a default driver of a vehicle. Each driver of the vehicle has a unique profile table 300. The method 400 proceeds to step 406, where a query determines whether to change the profile table 300. Namely, step 406 determines whether to use the profile table 300 for another driver. For example, the profile table 300 may be selected when a unique password is entered for a particular driver. If the profile table 300 is to be changed, the method 400 proceeds to step 408, where an appropriate profile table 300 is selected for another driver. After selecting the profile table 300, the method 400 returns to step 406.

If the profile table is not to be changed, the method 400 proceeds to step 410, where a query determines whether to change any of display allowance values in the profile table 300. If any of the display allowance values in the profile table 300 are to be changed, the method 400 proceeds to step 412, where the display allowance values are provided on the display 110 and adjusted by the driver using the input device 228. After step 412, the method returns to step 306.

If none of the display allowance values in the profile table 300 are to be changed, the method 400 proceeds to step 414, where a required driver attention (RDA) value is determined. In one embodiment, the RDA represents a previously determined, e.g., empirically determined, level of attention required at a given state of the vehicle, weather conditions and transportation conditions. One embodiment of a method implementing step 414 is described with respect to FIGS. 5A–5B.

After determining the RDA, the method 400 proceeds to step 416, where a query determines whether to adjust the display allowance value according to any applicable local ordinances. For example, step 416 may adjust the display allowance value such that a driver complies with any applicable, stringent local ordinances. Step 416 is embodied in a method described with respect to FIG. 6. Although the step 416 may change the display allowance value according to local ordinances, step 416 may also apply to various city, county, state or federal regulations.

After determining whether to adjust the display allowance value, the method 400 proceeds to provide the display 110 according to media conditions. In one embodiment, such media conditions include the type of content or media to display and the mode of media to display. Step 418 is embodied in a method described with respect to FIG. 7. After providing the display 110 at step 418, the method 400 proceeds to step 420, where a query determines whether to shut down the computer system 100 implementing the display 110. If the computer system 100 is to remain powered, the method 400 returns to step 416. If the computer system 100 is to be shut down, the method 400 proceeds to end at step 422.

Figure 5C:
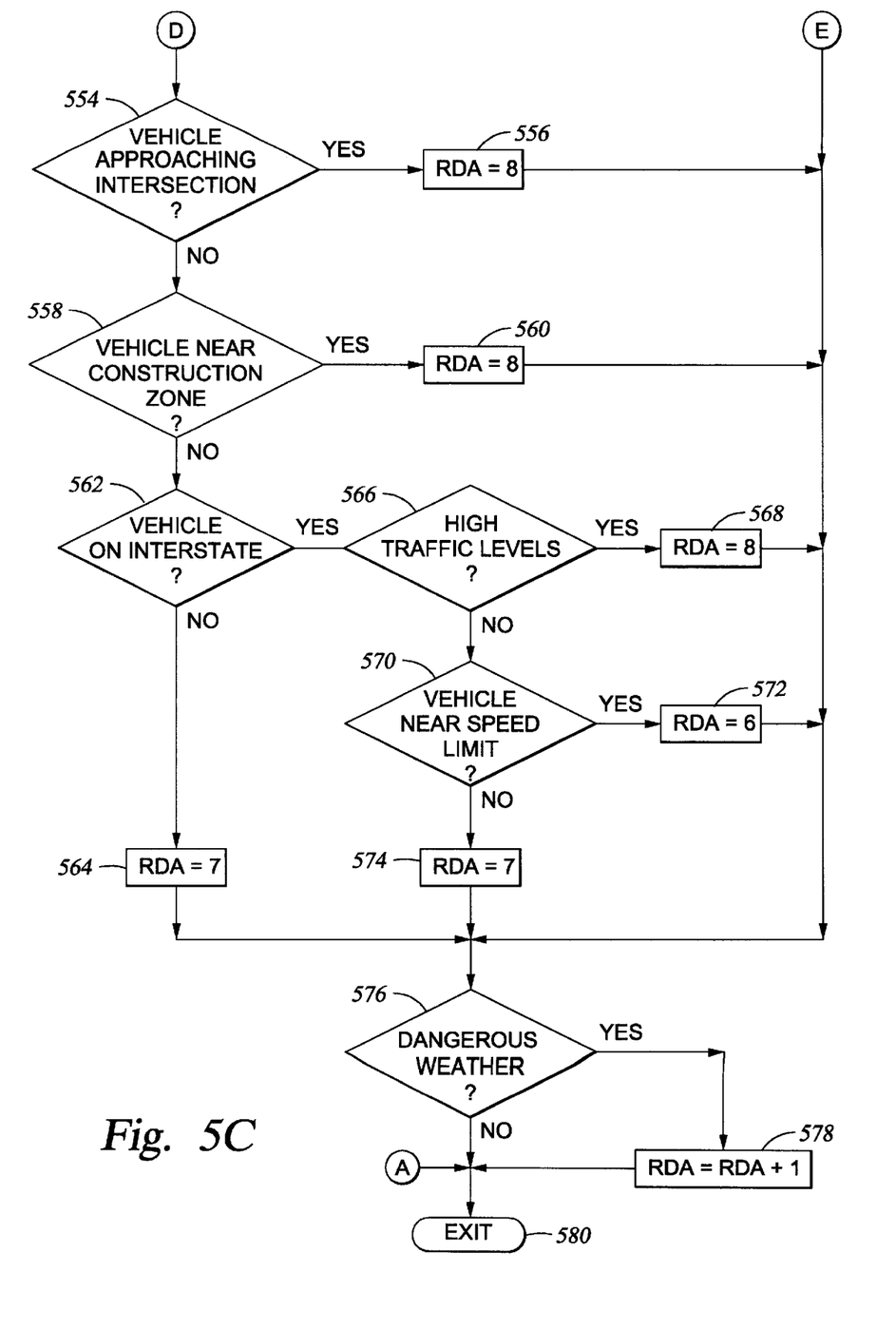

Referring to FIGS. 5A–5C, the method 500 is entered from step 414 to determine a required driver attention (RDA) value in accordance to one embodiment of the invention. More specifically, the method 500 starts at step 502 and proceeds to step 504, where the current location of the vehicle is updated from the GPS 220. The method 500 proceeds to step 506, where a query determines whether a change in location is detected by the GPS 220. If a change of location is detected, the method 500 refreshes the location information at step 508 and proceeds to step 510. If no change of information is detected, the method 500 proceeds directly to step 510.

At step 510, a query determines whether to provide a update of weather and traffic conditions surrounding or in a vicinity of the vehicle. For example, step 510 may determine whether a timer utilized to provide a update of the surrounding weather and traffic conditions has expired. If no update of the surrounding conditions is to be provided, the method 500 proceeds directly to step 516. If an update of the surrounding conditions is to be provided, the method 500 proceeds to step 512, where the weather conditions of the area surrounding the vehicle are updated from the weather database 236 using the location from step 504. At step 514, the method 500 updates the traffic conditions from the traffic database 238 using the location from step 504. After updating the traffic conditions, the method 500 proceeds to step 516.

At step 516, information is obtained from the local sensors, e.g., proximity sensors. The method 500 proceeds to step 518, where a query determines whether an engine of the vehicle is off. If the engine is off, the method 500 proceeds to assign a lowest possible value of the required driver attention (RDA), e.g., RDA=0, at step 520 and proceeds step 576.

If the engine is on, the method 500 proceeds to step 522, where a query determines whether the vehicle is parked or in a parked state. For example, step 522 determines whether a transmission of the vehicle is in a parked position. If the vehicle is parked, the method 500 proceeds to assign a very low RDA value, e.g., RDA=1, at step 524 and proceeds at step 576. If the vehicle is not parked, the method 500 proceeds to step 526, where a query determines whether the vehicle is stopped, i.e., whether the speedometer 222 indicates a zero speed.

If the vehicle is stopped, the method 500 proceeds to step 528, where a query determines whether the vehicle has been stopped for a long time. Such a long time is a predetermined threshold value such that minimal attention is required from the driver of the vehicle. If the vehicle has stopped for a long time, the method 500 proceeds to assign a very low RDA value, e.g., RDA=1, at step 530 and proceeds to step 576. If the vehicle has not stopped for a long time, the method 500 proceeds to step 532, where a query determines whether a stop light directly in front of the vehicle is about to change within a threshold amount of time. For example, step 532 may retrieve information about the stop light from the traffic database 238 and the location of the vehicle from the GPS 220 to determine whether the stop light directly in front of the vehicle would change to green in one second. If the stop light is about to change, the method 500 proceeds to assign a mid-level RDA value, e.g., RDA=5, at step 534 and proceeds to step 576.

If the stop light is not about to change, the method 500 proceeds to step 536, where a query determines whether the vehicle is on a highway or some other type of road. If the vehicle is on a highway, the method 500 proceeds to assign a low RDA value, e.g., RDA=2, at step 538 and proceeds to step 576. If the vehicle is not on a highway, the method 500 proceeds to assign a slightly higher RDA value, e.g., RDA= 3, at step 540 and proceeds to step 576.

Returning to step 526, if the vehicle has not stopped, the method 500 proceeds to step 542, where a query determines whether a traffic emergency exists within a predetermined area within the vehicle. Information of the traffic emergency is obtained from the traffic database 238. If a traffic emergency exists, the method 500 proceeds to assign a very high RDA, e.g., RDA=9, at step 544 and proceeds to step 576. If no traffic emergency exists, the method 500 proceeds to step 546, where a query determines whether the vehicle is at an unsafe distance from another vehicle located ahead. Such a determination of proximity depends on the speed of the vehicle and the distance between the vehicle and another vehicle. If the vehicle is at an unsafe distance from another vehicle ahead, the method 500 proceeds to assign a very high RDA, e.g, RDA=9, at step 548 and proceeds to step 576.

If the vehicle is not too close to (i.e., safely away from) another vehicle ahead, the method 500 proceeds to step 550, where a query determines whether frequent and significant steering of the vehicle occurs. Step 550 utilizes information from the steering wheel 218. Typically, such frequent and significant steering of the vehicle occurs in response to a hazardous road condition. The relative value of frequent and significant are defined within by driver display program 214. One example of frequent and significant steering may be 5 turns of 20 or more degrees within the past three minutes. If frequent and significant steering of the vehicle occurs, the method 500 proceeds to assign a relatively high RDA, e.g., RDA=8, at step 552 and proceeds to step 576.

If frequent and significant steering of the vehicle does not occur, the method 500 proceeds to step 554, where a query determines whether the vehicle is approaching an intersection. Information from the speedometer 222 and the GPS 220 are utilized to perform step 554. If the vehicle is approaching an intersection, the method 500 proceeds to assign a relatively high RDA, e.g., RDA=8, at step 556 and proceeds to step 576.

If the vehicle is not approaching an intersection, the method 500 proceeds to step 558, where a query determines whether the vehicle is proximate to a construction zone. Information from the speedometer 222 and the GPS 220 are utilized to perform step 558. If the vehicle is proximate to a construction zone, the method 500 assigns a relatively high RDA value, e.g., RDA=8, at step 560 and proceeds to step 576.

If the vehicle is not proximate to a construction zone, the method 500 proceeds to step 562, where a query determines whether the vehicle is on a interstate highway. Information from the GPS 220 may be utilized to perform step 562 if the vehicle is not on an interstate highway, the method 500 assigns a moderately high RDA value, e.g., RDA=7, at step 564 and proceeds to step 576.

If the vehicle is on an interstate highway or a high-traffic road, the method 500 proceeds to step 566, where a query determines whether the vehicle is on a road having a high level of traffic. Step 566 utilizes traffic information from the traffic database 238 but may also use information from the proximity sensors 224. If the vehicle is on a road having a high level of traffic, the method 500 proceeds to assign a high RDA value, e.g., RDA=8, at step 568 and proceeds to step 576.

If the vehicle is on a road not having a high level of traffic, the method 500 proceeds to step 570, where a query determines whether the speed of the vehicle is near the speed limit of the road. Step 570 utilizes information from the speedometer 222 and the legal database 234. The speed of the vehicle is considered near the speed limit if the speed of the vehicle is within a predefined threshold of the speed limit. If the speed of the vehicle is near the speed limit, the method 500 assigns a relatively high RDA value, e.g., RDA=6, at step 572 and proceeds to step 576. If the speed of the vehicle is not near the speed limit, the method 500 assigns a slightly higher RDA value, e.g., RDA=7, at step 574 and proceeds to step 576.

At step 576, a query determines whether the weather is dangerous to travel in the area where the vehicle is driving in. Namely, step 576 determines whether the weather from the weather database 236 is one of a predefined set of bad weather conditions for the location of the vehicle. Such bad weather conditions may include icy road conditions and very high humidity conditions, e.g., over 90% humidity. If the weather is dangerous to travel, the method 500 proceeds to increase the RDA by one at step 578 and exits at step 580, i.e., returns to step 416. If the weather is not dangerous to travel, the method 500 proceeds to exit at step 580.

FIG. 5 only represents an illustrative example to determine the required driver attention (RDA) value. The method 500 may utilize other RDA values for the various traffic conditions and states of the vehicle. The RDA values may also assume other ranges, e.g., a 0–100 scale, a −10 to 10 scale. Additionally, the RDA values of the method 500 may be adjusted or assigned differently in response to different types weather conditions. For example, icy road conditions would require a higher increase in the RDA than conditions with light snowfall.

Referring to FIG. 6, the method 600 is entered from step 416 to adjust the display allowance values of a profile table 300 in accordance with local ordinances. More specifically, the method 600 starts at step 602 and proceeds to step 604, where a query determines whether local ordinances from the legal database 234 are available. Namely, step 604 determines whether local ordinance information is available for a city, town or municipality where the vehicle is currently located. If local ordinances are not available, the method 600 proceeds to step 606, where the current profile table 300 of display allowance values is reloaded from the memory 204 to the microprocessor 202. After reloading the profile table 300, the method 600 exits at step 614, e.g., returns to step 416. If local ordinances are available, the method 600 proceeds to step 608, where each display allowance value in the profile table 300, as illustratively shown in FIG. 3, is processed.

At step 610, a query determines whether the local ordinance value is less than a display allowance value being processed in the profile table 300. A strict local ordinance may result in a local ordinance value that is lower than display allowance value in the profile table 300. If the local ordinance value is not less than the display allowance value, the method 600 returns to process the next display allowance value at step 608. If the local ordinance value is less than the display allowance value, the method 600 proceeds to step 612, where the display allowance value is replaced with the (lower) local ordinance value. After replacing the display allowance value, the method 600 returns to process the next display allowance value at step 608. Once all the display allowance values in the profile table 300 are processed, the method 600 exits at step 614.

Although the method 600 adjusts the display allowance value in response to local ordinance values, the method 600 may similarly adjust required driver attention (RDA) values according to local ordinance values. For example, a strict local ordinance may require an increase of the RDA value, thereby reducing the probability of a display 110.

Referring to FIGS. 7A and 7B, the method 700 is entered from step 418 to provide the display 110 in accordance with an embodiment of the present invention. More specifically, the method 700 starts at step 702 and proceeds to step 704, where each window in the display 110 is processed. The method 700 retrieves information of the media type and the media mode of the window at step 706 and retrieves the corresponding display allowance value from the profile table 300 at step 708.

At step 710, a query determines whether display allowance value is greater than the Required Driver Attention (RDA) value. If the display allowance value is at least the RDA value, the method 700 proceeds to display the window at step 712 and returns to process the next window at step 706. If the display allowance value is less than the RDA value, the method 700 proceeds to step 714, where a query determines whether a type of media that is less distracting may be provided in the window of the display 110. For example, if the display allowance value for displaying motion video is less than the RDA value, step 714 determines whether still video (which may have a higher display allowance value in the profile table 300) may be provided on the window. If a less distracting type of media may be provided on the window is possible, the method 700 proceeds to reduce the type of media at step 716 and returns to step 706. If a less distracting type of media is not possibly provided on the window, the method 700 proceeds to darken or silence the window at step 718 and returns to step 706.

Once all the windows of the display 110 are processed at step 706, the method 700 proceeds to step 720, where a query determines whether a RDA value is within a range indicative of a diversion of the driver illustratively, such a range includes RDA values in the range of 3 to 7 as listed in Table 2 below:

TABLE 2

| Type of Diversion | RDA Value | Timer Value |
|---|---|---|
| Very Short | 7 | 3 seconds |
| Short | 6 | 6 seconds |
| Medium | 5 | 9 seconds |
| Long | 4 | 15 seconds |
| Very Long | 3 | 30 seconds |

If the RDA value is not within the range indicative of a diversion of the driver, the method 700 proceeds to step 732. If the RDA value is within the range indicative of a diversion of the driver, the method 700 proceeds to step 722, where a query determines whether a timer (not shown) is running. The timer is utilized to track a diversion of a driver of the vehicle. If the timer is not running, the method proceeds to step 724, where a query determines whether an eye tracker 226 exists in the computer system 200. If no eye tracker 226 exists in the computer system 200, the method 700 proceeds to start the timer at step 728. If the eye tracker exists in the computer system 200, the method 700 proceeds to step 726, where a query determines whether the driver's visual attention has diverted from the road. Namely, step 726 determines whether the eye tracker 226 detected that the driver had looked off the road. If the driver looked off the road, the method 700 starts the timer at step 728 and proceeds to step 738. If the driver had not looked off the road, the method 700 proceeds directly to step 738. If the driver had looked off the road, the method 700 proceeds to start the timer for timing the diversion at step 728 and to step 738.

Returning to step 722, if the timer is running, the method 700 proceeds to step 730, where a query determines whether the timer utilized to track driver diversion has expired. If the timer has expired, the method 700 proceeds directly to step 738 if the timer has not expired, the method 700 proceeds to step 732, where a visual reminder is provided on the display 110. At step 734, a query determines whether to provide an audible reminder to the driver. If the audio reminder is not to be provided, the method 700 proceeds directly to step 738. If the audio reminder is to be provided, the method 700 provides an audio reminder via the display 110. After providing the audio reminder, the method 700 proceeds to step 738.

At step 738, a query determines whether a cellular telephone usage value is less than the RDA value. If the cellular telephone usage value is not less than the RDA value, cellular telephone usage is acceptable and the method 700 proceeds to exit at step 748. If the cellular telephone usage value is less than the RDA value, the method 700 proceeds to step 740, where a query determines whether the cellular telephone or cordless telephone 230 is in use. If the cellular telephone 230 is not in use, the method 700 proceeds to disable all incoming and outgoing calls at step 746 and exits at step 748.

If the cellular telephone 230 is in use, the method 700 proceeds to step 742, where an audible warning is provided to the driver. At step 744, a query determines whether a maximum amount of warnings have been provided. If the maximum amount of warnings have been provided, the method 700 proceeds to disable all incoming and outgoing calls at step 746 and exits at step 748. If the maximum amount of warnings have not been provided, the method 700 proceeds to exit at step 748.

Although various embodiments which incorporate the teachings of the present invention have been shown and described in detail herein, those skilled in the art can readily devise many other varied embodiments that still incorporate these teachings.

While the foregoing is directed to the preferred embodiment of the present invention, other and further embodiments of the invention may be devised without departing from the basic scope thereof, and the scope thereof is determined by the claims that follow.

What is claimed is:

1. Method for providing information on a display in a vehicle, the method comprising:

receiving navigation information from at least one of a remote database via a wireless network and a local sensor;

determining a driver attention threshold from the received navigation information; and displaying information received from a network information source via the wireless network if the driver attention threshold is exceeded by a display allowance value indicative of at least one of a type of information to be displayed and a type of media to be displayed.

2. The method of claim 1 wherein the receiving, determining and displaying steps are updated upon movement of the vehicle.

3. The method of claim 1 wherein the navigation information from the local sensor comprises at least one of information from a turn indicator, information from a steering wheel, information from a global positioning system (GPS), information from a speedometer, information from proximity sensors and information from an eye-tracking device.

4. The method of claim 1 wherein the navigation information from the remote database comprises at least one of weather information, traffic information and local ordinance information.

5. The method of claim 1 wherein the driver attention threshold is indicative of a level of attention required by a driver of a given level of skill.

6. The method of claim I wherein the step of determining comprises:

assigning an initial value to the driver attention threshold value using navigation information from at least one sensor.

7. The method of claim 6 wherein the step of determining further comprises:

updating the driver attention threshold using the navigation information from at least one remote database, where the navigation information comprises weather information and traffic information.

8. The method of claim 7 wherein the navigation information further comprises local ordinance information.

9. The method of claim 1 further comprising:

adjusting the display allowance value using the local ordinance information.

10. The method of claim 9 wherein the step of adjusting further comprises:

determining whether a value of the local ordinance information is lower than the display allowance value; and if so, updating the display allowance value with the value of local ordinance information.

11. The method of claim 1 wherein the display allowance value, for each type of information and each type of media, is contained in a data structure.

12. The method of claim 11 wherein the display allowance values vary for different drivers of the vehicle.

13. The method of claim 1 wherein the information to be displayed from the network information source comprises information from a remote server computer.

14. The method of claim 1 wherein the type of information to be displayed comprises at least one of driver warnings, information requiring a driving decision, normal communication information, and advertisements.

15. The method of claim 1 wherein the type of media to be displayed comprises at least one of text, images and video.

16. The method of claim 1 further comprising:

determining whether a cellular telephone is being used;

assigning a phone value for using the cellular telephone; and disabling the cellular telephone if phone value is less than the driver attention threshold.

17. An apparatus for providing information on a display in a vehicle, the apparatus comprising:

an interface for receiving navigation information from at least one of a remote database and a local sensor;

a memory for storing a display program;

a display device, coupled to the interface, for displaying information from a network information source via the wireless network; and a microprocessor, coupled to the interface and the memory, wherein the microprocessor, upon executing the display program is configured to:

determine a driver attention threshold from the navigation information received at the interface; and provide information from the network information source to the display device if the driver attention threshold is exceeded by a display allowance value indicative of at least one of a type of information to be displayed and a type of media to be displayed.

18. The apparatus of claim 17 wherein the interface comprises, a wireless interface configured to receive navigation information from a local database, and a sensor interface configured to receive navigation information from at least one local sensor.

19. The apparatus of claim 17 wherein the memory further stores a profile table comprising of a plurality of display allowance values for different types of information to be displayed and different media types to be displayed.

20. The apparatus of claim 17 wherein the display device comprises a heads-up display located on the front window.

21. The apparatus of claim 17 wherein the display device is located in the vehicle to at least one of least one of a dashboard, a steering wheel, and above a stereo module.

22. A computer readable medium storing a software program that, when executed by a computer, causes a microprocessor to perform operations comprising:

receiving navigation information from at least one of a remote database via a wireless network and a local sensor;

determining a driver attention threshold from the received navigation information; and displaying information received from a network information source via the wireless network if the driver attention threshold is exceeded by a display allowance value indicative of at least one of a type of information to be displayed and a type of media to be displayed.

23. The computer readable medium of claim 22 wherein the receiving, determining and displaying operations are updated upon movement of the vehicle.

24. The computer readable medium of claim 22 wherein the navigation information from the sensor comprises at least one of information from a turn indicator, information from a steering wheel, information from a global positioning system (GPS), information from a speedometer, information from proximity sensors and information from an eye-tracking device.

25. The computer readable medium of claim 22 wherein the navigation information from the remote database comprises at least one of weather information, traffic information and local ordinance information.

26. The computer readable medium of claim 22 wherein the driver attention threshold is indicative of a level of attention required by a driver of a given level of skill.

27. The computer readable medium of claim 22 wherein determining comprises:

assigning an initial value to the driver attention threshold value using navigation information from at least one sensor.

28. The computer readable medium of claim 27 wherein determining further comprises:

updating the driver attention threshold using the navigation information from at least one remote database, where the navigation information comprises weather information and traffic information.

29. The computer readable medium of claim 28 wherein the navigation information further comprises local ordinance information.

30. The computer readable medium of claim 22 wherein the method further comprises:

adjusting the display allowance value using the local ordinance information.

31. The computer readable medium of claim 30 wherein adjusting further comprises:

determining whether the value of the local ordinance information is lower than the display allowance value; and if so, updating the display allowance value with the value of local ordinance information.

32. The computer readable medium of claim 22 wherein the display allowance value, for each type of information and each type of media, is contained in a data structure.

33. The computer readable medium of claim 32 wherein the display allowance values vary for different drivers of the vehicle.

34. The computer readable medium of claim 22 wherein the information to be displayed from the network information source comprises information from a remote server computer.

35. The computer readable medium of claim 22 wherein the type of information to be displayed comprises at least one of driver warnings, information requiring a driving decision, normal communication information, and advertisements.

36. The computer readable medium of claim 22 wherein the type of media to be displayed comprises at least one of text, images and video.

37. The computer readable medium of claim 22 wherein the operations further comprise:

determining whether a cellular telephone is being used;

assigning a phone value for using the cellular telephone; and disabling the cellular telephone if phone value is less than the driver attention threshold.

38. The computer readable medium of claim 22 wherein the type of media to be displayed comprises a format in which the information is to be displayed.

\* \* \* \* \*